(12) United States Patent
Colgan et al.

(10) Patent No.: US 6,204,897 B1
(45) Date of Patent: Mar. 20, 2001

(54) INTEGRATED RESISTOR FOR MEASURING TOUCH POSITION IN A LIQUID CRYSTAL DISPLAY DEVICE

(75) Inventors: Evan George Colgan, Chestnut Ridge; James Lewis Levine, Yorktown Heights; Michael Alan Schappert, Fishkill, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/135,586

(22) Filed: Aug. 18, 1998

(51) Int. Cl.[7] .................................................. G02F 1/1335
(52) U.S. Cl. ................................... 349/12; 349/111
(58) Field of Search ...................... 345/174, 104; 178/18.05; 349/12

(56) References Cited

U.S. PATENT DOCUMENTS

| | | | | |
|---|---|---|---|---|
| 4,071,691 | * | 1/1978 | Pepper, Jr. ........................ | 178/19 |
| 4,493,104 | * | 1/1985 | Lukis et al. ....................... | 382/13 |
| 5,181,030 | * | 1/1993 | Itaya et al. ........................ | 341/20 |
| 5,283,558 | * | 2/1994 | Chan ................................. | 345/168 |
| 5,353,135 | * | 10/1994 | Edwards ........................... | 359/55 |
| 5,451,724 | * | 9/1995 | Nakazawa et al. ............... | 178/20 |
| 5,777,604 | * | 7/1998 | Okajima et al. .................. | 345/173 |
| 5,963,277 | * | 10/1999 | Kim et al. ......................... | 349/12 |

OTHER PUBLICATIONS

J.H. Kim et al., "8.3: A Design of the Position–Sensitive TFT–LCD for Pen Application", SID '97, pp. 87–90.
N. Ikeda et al., "A New TFT–LCD with Built–In Digitizing Function", ISW '97, pp. 199–202.

* cited by examiner

Primary Examiner—Kenneth Parker
(74) Attorney, Agent, or Firm—Martin Underweiser

(57) ABSTRACT

The present invention provides for a liquid crystal display device with a signal layer integrated onto a substrate. Circuitry derives touch position based upon response to signals applied to the signal layer. At least one resistor is integrated onto the substrate. The resistor is coupled between the signal layer and the circuitry. The resistor is formed in conjunction with the signal layer. Preferably, the resistor is part of a resistor network for linearizing resistance of the signal layer in a vertical direction and horizontal direction.

10 Claims, 11 Drawing Sheets

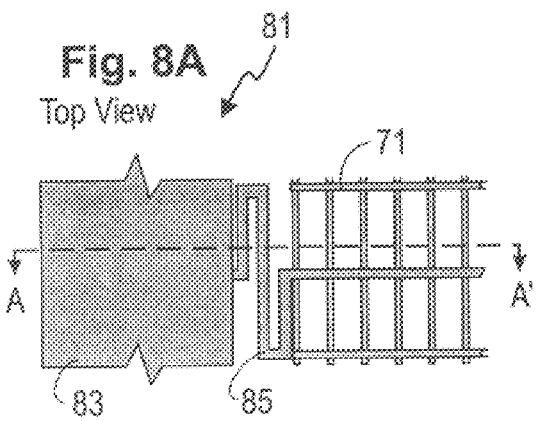
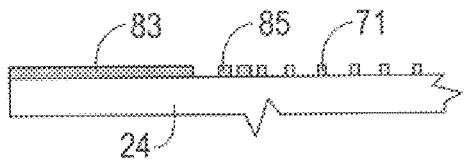
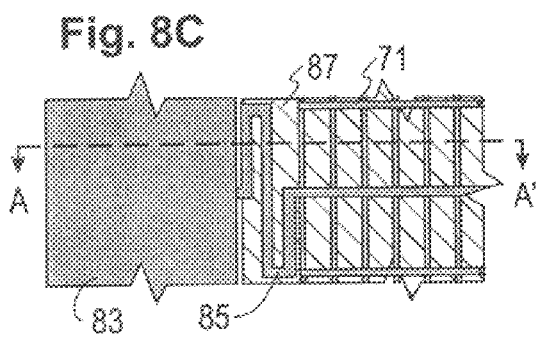
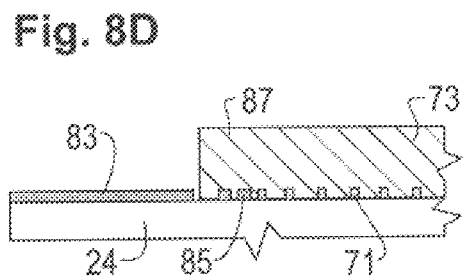
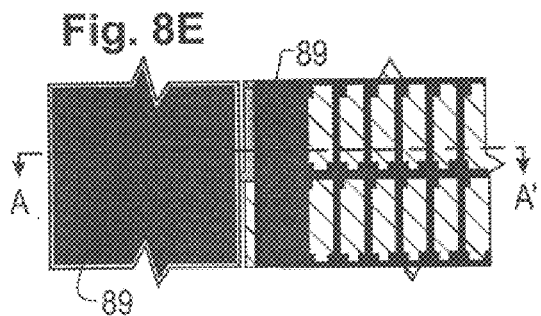
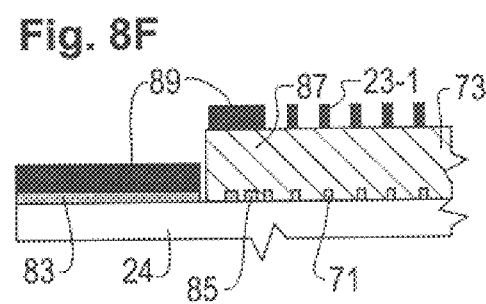
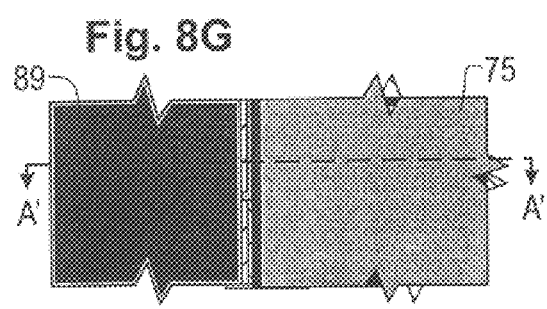
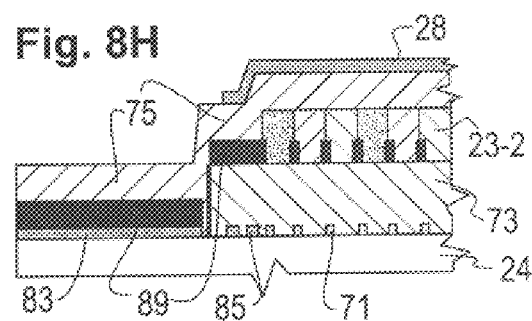

INTEGRATED RESISTOR FOR MEASURING TOUCH POSITION IN A LIQUID CRYSTAL DISPLAY DEVICE

BACKGROUND OF THE INVENTION

1. Field of the Invention

This invention relates to liquid crystal displays (LCD's) employing means for measuring touch position, and, more particularly to LCDs wherein such touch measuring means is integrated into a substrate of the LCD.

2. Related Art

Touch input systems which determine the location of an object or person touching a surface are utilized in a wide variety of application and require that the location of the touch be determined with a high degree of accuracy. Typically, these devices are transparent and are fitted directly over a computer display. Examples of such add-on touch screens which can be fitted over a CRT or flat panel display may be found in "You can touch this! Touch screens deliver multimedia to the masses" by C. Skipton, New Media, Feb. 10, 1997, p. 39–42. Add-on touch screens have used a variety of methods for determining the touch location. Typically, the surface of such a system includes a layer of substantially uniform resistivity and electrodes are connected to the edges of the surface. The electrodes are usually made of a material which is more conductive than the surface and are often silk-screened onto the surface in a specific pattern. A frequently used method of determining the location is to apply an electric potential in a first direction and then apply an electric potential across the surface in a second direction orthogonal to the first direction. As described in U.S. Pat. No. 3,591,718 to Shintaro et al. and U.S. Pat. No. 4,649,232 to Nakamura et al., the x and y location can be determined using a capacitively coupled probe (through an insulating layer) to measure the voltages. The location of a finger touch can be determined by monitoring the current flow through the electrodes since the body shorts the applied AC signal to ground but this requires that the stray currents in the system are very small due to the small capacitance to a finger. U.S. Pat. No. 4,293,734 to Pepper, Jr describes an alternate approach by i) applying power to all four sides with an AC signal and using the ratio of electrode currents to determine the finger touch location, or ii) grounding the corners and measuring and currents induced by a powered stylus at the corners. In U.S. Pat. No. 4,686,332 to Grenias et. al., an add-on touch screen is described that includes two spaced conductor planes. Finger touch position is determined by detecting the change in the capacitance of conductor planes due to the finger touch. Finally, in U.S. Pat. No. 4,371,746, an add-on touch panel is described that includes a guard layer of conductive material beneath (or partially surrounding) a resistive touch surface. The guard layer of the add-on panel is energized with a signal that is the same amplitude and phase as the signal applied to the resistive touch surface in order to substantially reduce the effective capacitance to ground of the resistive touch surface.

A disadvantage of such add-on touch screens is that they increase the weight and size of the display unit, which is a strong demerit for use in portable applications such as notebook computers. In addition, communication of the device to the computer requires an available card slot or serial or parallel port adapter. These disadvantages can be greatly reduced by integration of the touch sensor into the LC display. For application to liquid crystal displays, especially for portable applications, a capacitive touch technique is most suitable because of the compact size and high transmissivity (85–90%). Resistive touch technologies require two layers of Indium Tin Oxide (ITO), rather than one, and have a transmissivity of only 55 to 75%.

Typically, for a color LC display, the glass substrate orientated towards the viewer has the color filter built onto the inner surface which contacts the liquid crystal material and the color filter substrate (CF) is bonded along the edges to a second glass substrate which contains a active (or passive) matrix for addressing the LC display. The color filter is typically composed of a black matrix material (such as layers of Cr and Cr oxide), polymer layers containing pigments or dyes, and an ITO layer which is used as a common electrode for the display (in an active matrix display, or for a passive matrix display, it is patterned into lines and used for addressing the display), see "Color filter for 10.4 in. diagonal 4096-color thin-film-transistor liquid crystal displays", T. Koseki et al. IBM J. Res. Develop. Vol. 36 No. 1 January 1992. Additionally, a photosensitive transparent overcoat layer is frequently used to planarize the pigmented regions prior to the ITO common electrode deposition as described in U.S. Pat. No. 5,278,009 to Tsutsumi et al.

There have been two reports on modification of the upper glass substrate (e.g., the substrate that includes the color filter) of an LCD to permit stylus input using capacitive sensing. In the publication by J. H. Kim et al. "A design of the position-sensitive TFT-LCD for pen applications", SID '97, p. 87–90, the conductive black matrix (BM) layer in the color filter was isolated from the ITO common electrode by an overcoat layer and an AC signal was applied to the BM. Compensation resistors were formed outside the array to linearize the electric field and the direction (X & Y) of the applied field was alternated and the stylus position determined by measuring the voltage capacitively coupled into the tethered stylus. It was noted that a large signal was induced on ITO common electrode layer, with an amplitude of almost half of the input signal to the BM.

In the publication by H. Ikeda et al., "A New TFT-LCD with Build-in Digitizing Function", ISW '97, p. 199–202, a 6.6 inch VGA reflective Guest-Host AMLCD is described which uses the ITO common electrode as a resistive layer for stylus input. An AC signal voltage gradient is applied alternately in the X or Y direction on top of the DC bias on the ITO common electrode. Some linearization of the field was performed by using separate Al strip electrodes along each edge which were connected to the active region by ITO resistors 0.25 mm wide×1 mm long on 2.5 mm centers. The Al resistivity was adjusted for the best linearization without excessive power consumption. The field was measured capacitively from a tethered stylus and the location determined using data pre-measured for typical positions on the display and stored in the computer.

Neither of these integrated structures is appropriate for measuring the contact position of a portion of the human body (such as a finger or a toe) with a substrate of the LCD due to the fact that the capacitive coupling (i.e., the effective capacitance) between the signal layer and the ITO common electrode (Kim et al.) or the wiring in the TFT array (Ikeda et al.) is much stronger than the capacitive coupling (effective capacitance) between the substrate and the human body.

Thus, there is a need in the art to develop a structure integrated into a substrate of the LCD that is suitable for measuring the contact position of a portion of the human body (such as a finger or a toe) with the substrate.

In addition, there is a need in the art to develop a structure that can be economically integrated into a substrate of the LCD to provide linearization of the signal layer.

SUMMARY OF THE INVENTION

The above stated problems and related problems of the prior art are solved with the principles of the present invention, which provides for a liquid crystal display device with a signal layer integrated onto a substrate. Circuitry derives touch position based upon response to signals applied to the signal layer. At least one resistor is integrated onto the substrate. The resistor is coupled between the signal layer and the circuitry. The resistor is formed in conjunction with the signal layer. Preferably, the resistor is part of a resistor network for linearizing resistance of the signal layer in a vertical direction and horizontal direction.

BRIEF DESCRIPTION OF THE DRAWINGS

FIGS. 8(A)–(H) is a pictorial illustration of the process steps in forming the top substrate of FIG. 6.

DETAILED DESCRIPTION OF THE PREFERRED EMBODIMENT

Figure 1:
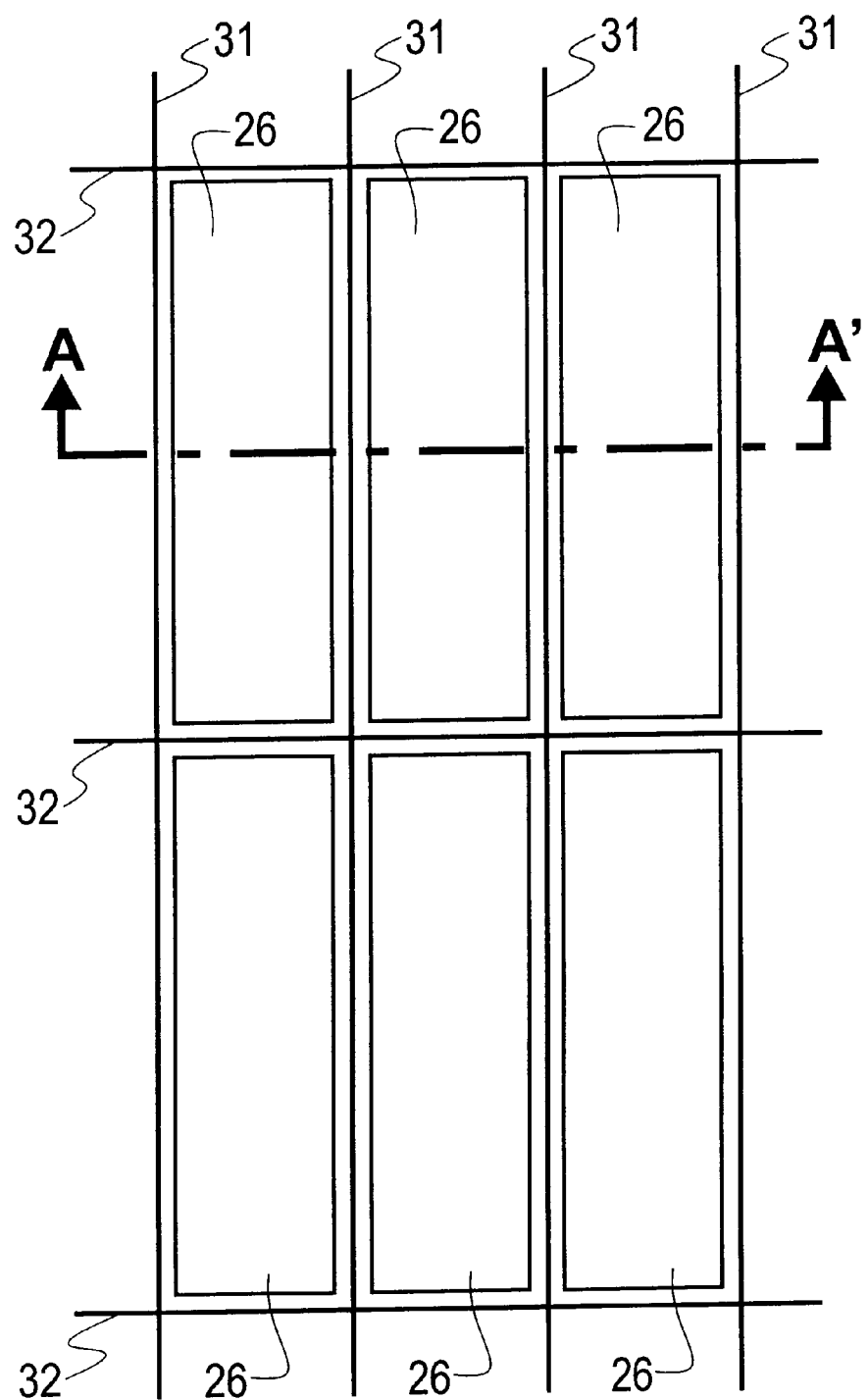
FIG. 1 is a top view of a conventional crossover type active-matrix liquid crystal display device.

FIG. 1 illustrates a top view of a conventional liquid crystal display device wherein a pixel electrode 26 (shaded region) is formed below the sub-pixels (6 shown) of the display. Typically, a pixel is represented by 3 adjacent red (R), green (G) and blue (B) sub-pixels (i.e., 3 adjacent sub-pixels having R, G, B color matrix formed over the pixel electrode 26). The sub-pixels are formed between gate lines 32 (3 shown) and data lines 31 (4 shown).

Figure 2:
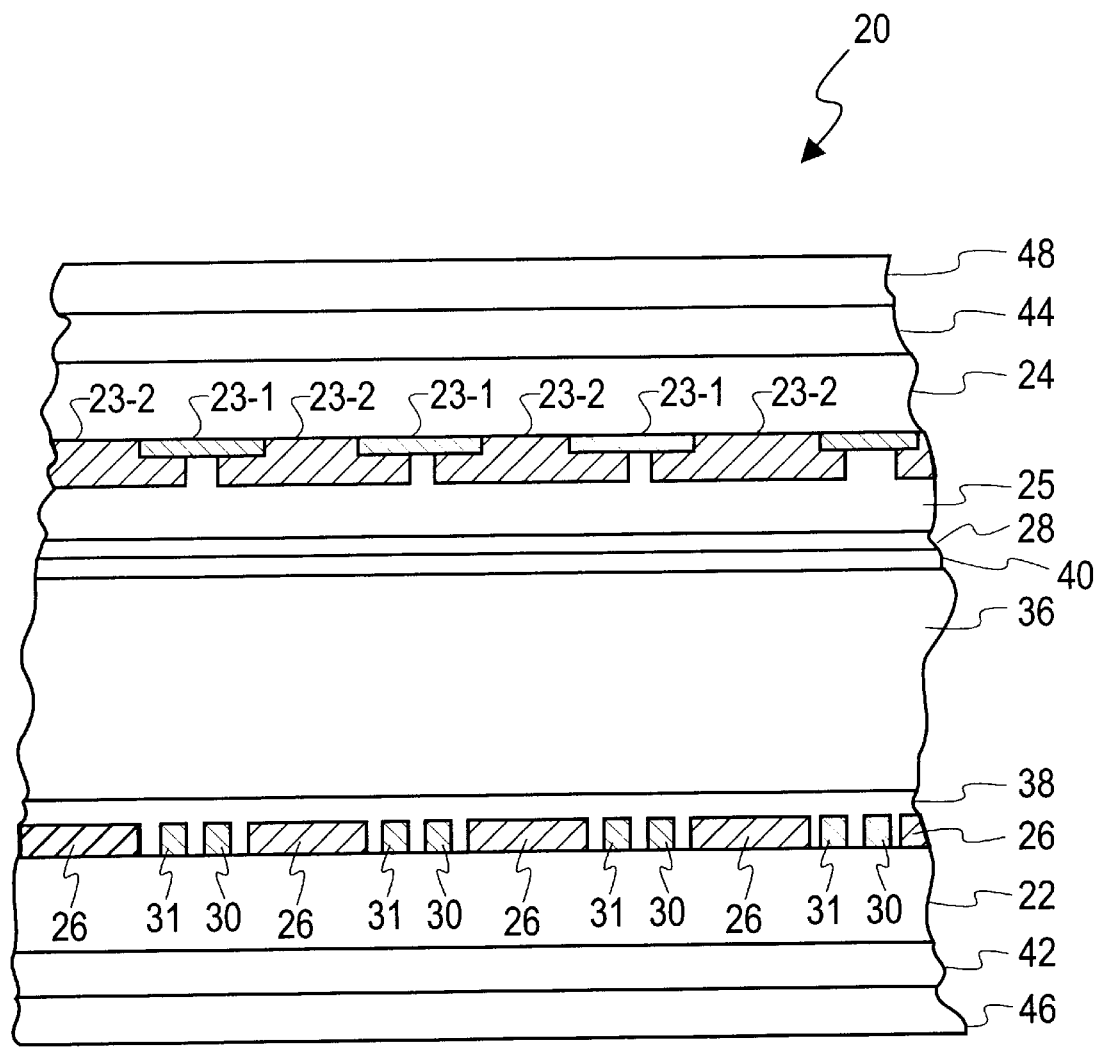
FIG. 2 illustrates a partial cross section (A—A) of the liquid crystal display device of FIG. 1.

FIG. 2 illustrates a partial cross-section of the conventional liquid crystal display device of FIG. 1. The device includes a first substrate 22 (referred to below as the bottom substrate) and a second substrate 24 (referred to below as the top substrate) formed of a transparent material such as glass. The two substrates are arranged so as to be parallel to one another with a high degree of precision. Typically, the substrates 22, 24 are separated from one another with plastic spacer balls having a diameter approximately one to twenty microns (usually 3 to 5 microns), and are sealed at their edges (not shown) so as to define a closed interior space there between. The first substrate 22 has deposited thereon an array of pixel electrodes 26 which define sub-pixels of the liquid crystal display. Also formed on substrate 22 in selected areas not having electrode films deposited thereon are semiconductor devices such as diodes or thin film transistors (TFTS) 30. As is well known in the art, there are one or more TFTs 30 for each sub-pixel. TFTs 30 are each controlled by a conductive gate line 32 (not shown) and a conductive data line 31, which are typically deposited on substrate 22 in a manner so as not to be electrically connected to electrodes 26 except that the source of each TFT 30 is electrically connected to one respective electrode 26. Gate lines 32 (not shown) and data lines 31 are also electrically insulated from one another at crossover regions. The second substrate 24 typically has deposited thereon a color matrix layer 23. The color matrix layer 23 typically has a black matrix material 23-1 interleaved with R, G, or B color matrix material 23-2. The black matrix material 23-1 is disposed opposite the TFTs 30, data line 31 and gate line 32 (not shown) in order to block these elements from ambient incident light and prevent light leakage outside the pixel area. The color matrix material 23-2 is disposed opposite the pixel electrode 26. In addition, a common electrode 28 is typically formed above the color matrix layer 23. As described above, a photosensitive transparent overcoat layer 25 may be applied to the color matrix material prior to the deposition of common electrode deposition in order to planarize the pigmented regions. The common electrode 28 is preferably formed of a thin transparent layer of a conductive material, such as indium tin oxide (ITO) or other suitable material.

A liquid crystal material 36 fills the space between substrates 22 and 24. The nature of the material depends on the mode of operation of liquid crystal display 20, as will be more fully explained below. The interior surfaces of the liquid crystal display may be coated with respective alignment layers 38 and 40 to provide boundary conditions for the molecules of liquid crystal material 36. The exterior surfaces of substrates 22 and 24 may have respective optical compensating films 42 and 44 disposed thereon. Finally, respective polarizing films 46 and 48 may be applied over compensation films 42 and 44 (if compensating films are used), respectively, or applied over substrate 22 and 24 (if compensating films are not used), respectively.

Conventional liquid crystal displays of the type illustrated in FIG. 2 are illuminated by a light source (not shown) that is located behind the bottom substrate 22 and viewed from above the top substrate 24.

Figure 3:
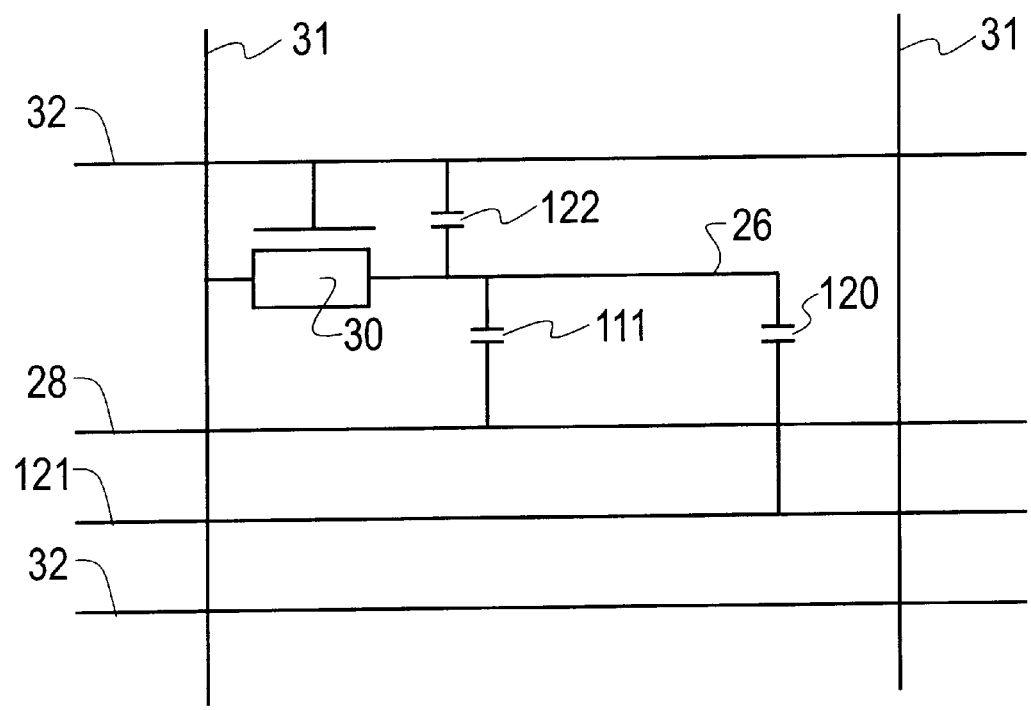
FIG. 3 is a schematic drawing of a pixel of the active-matrix liquid crystal display device of FIG. 1.

The schematic drawing of a sub-pixel is shown in FIG. 3, where the attached numbers have correspondingly the same meanings as in FIGS. 1 and 2. The capacitor 111 denotes the capacitance of the liquid crystal material 36 sandwiched between the pixel electrode 26 and the common electrode 28. The cell may include a storage capacitor 120 which provides a parallel capacitance to the liquid crystal capacitance 111 and which is terminated on line 121 common to all the storage capacitors in the display. Another alternative design for the storage capacitor is the storage capacitor 122 disposed between the pixel electrode 26 and the gate line 32.

When a voltage below a threshold voltage is applied on the gate line 32, the TFT 30 is in the off-condition so that the potentials on the data line 31 and pixel electrode 26 are isolated from one another. When a voltage larger than a threshold voltage is applied on the gate line 32, the TFT 30 is in an on-condition (low impedance state), thereby allowing the voltage on the data line 31 to charge the pixel electrode 26. The voltage applied to the data line 31 may vary such that there are different voltages applied to the electrode pixel 26. The potential difference between the voltage applied to the pixel electrode 26 and the voltage of the common electrode 28 controls the orientation of the liquid crystal molecules of the cell. Varying the potential difference between the voltage applied to the pixel electrode 26 and the voltage of the common electrode 28 is used to control the orientation of the liquid crystal molecules of the cell such that different amounts of light are transmitted across the liquid crystal, thus resulting in the display of a gray scale of light.

Figure 4:
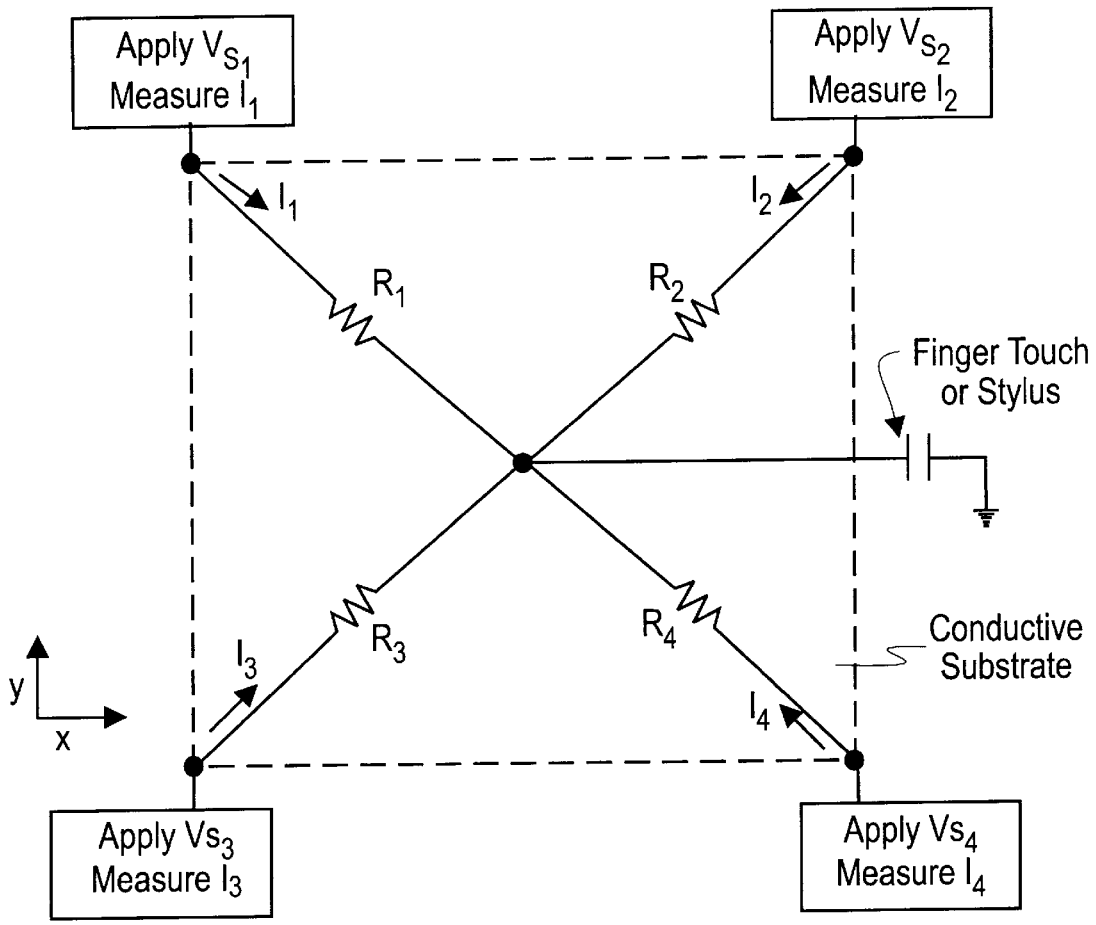
FIG. 4 is a pictorial illustration of the touch input functionality of the present invention.

The present invention integrates touch (and stylus) input functionality into the top substrate 24 of the display. A schematic representation of such functionality is shown in FIG. 4. More specifically, a conductive layer, which may be patterned, is integrated into the top substrate 24. The conductive layer, hereinafter referred to as the signal layer, is electrically isolated from the common electrode 28 of the top substrate 24. A signal generator applies a signal to the corners of the signal layer, and the current that flows at each corner is measured. When a user contacts the top substrate 24 with a portion of the human body (for example, a finger or a toe) or with an implement (for example, the pointed end of a conductive stylus), an R-C network is formed by capacitive coupling causing current to flow from the corners through the signal layer toward the point of contact. The position of the touch (i.e., the point of contact) can be derived from the currents at the corners of the signal layer. Alternatively, instead of applying signals to the corners of the signal layer, the tip of the implement (such as a stylus) may carry a signal, and the current at the corners of the signal layer measured. In this case, when the implement tip contacts (or is in close proximity to) the top substrate 24, an R-C network is formed by capacitive coupling causing current to flow at the corners. The position of the implement can be derived from the currents at the corners of the signal layer. An example of circuitry for deriving the touch position from the currents at the corners of the signal layer is described in U.S. Pat. No. 4,293,734 to Pepper, Jr., herein incorporated by reference in its entirety. This circuitry may be integrated into the display panel, or may be provided on a integrated circuit that is electrically coupled to corners of the signal layer.

Figure 12:
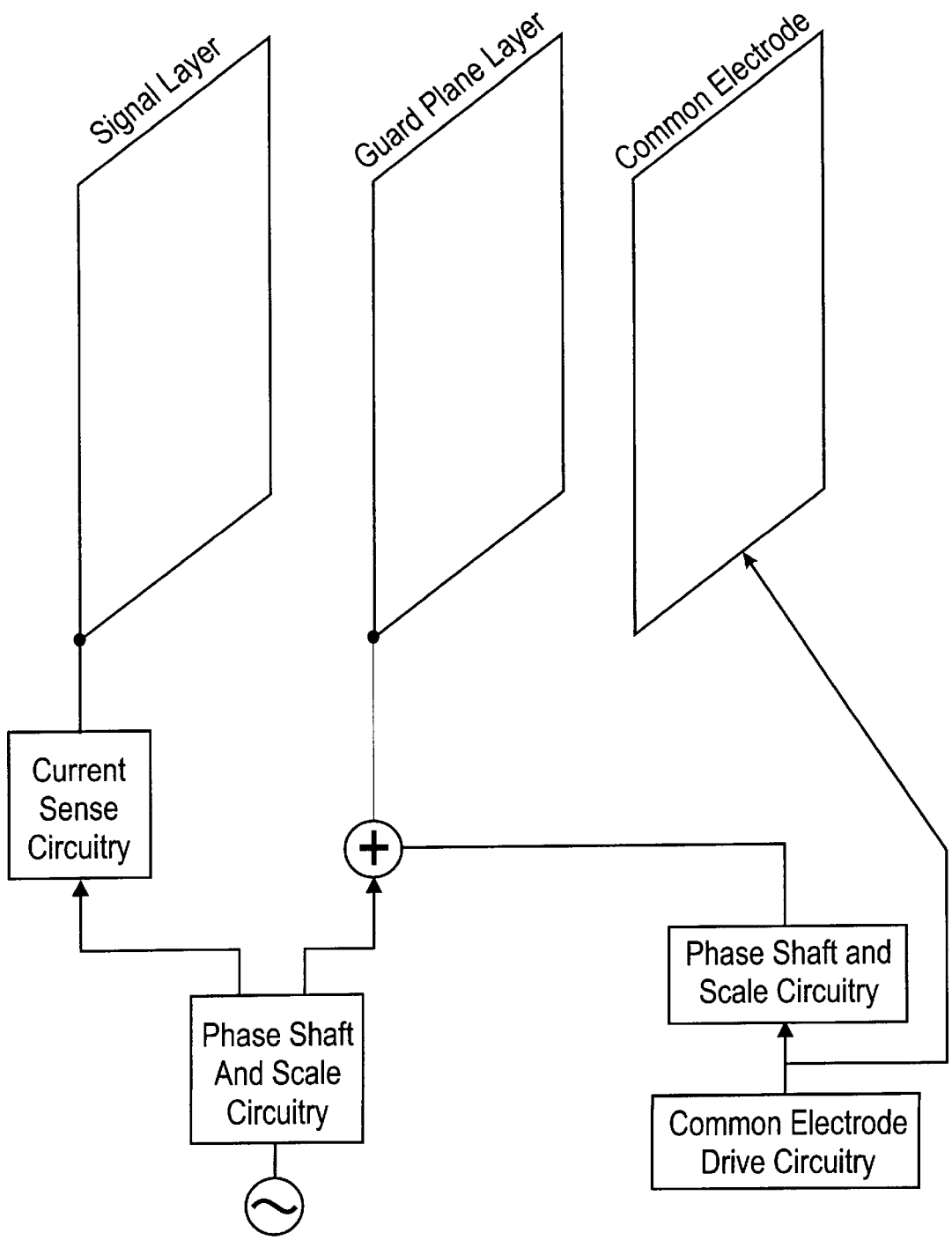
FIG. 12 is a pictorial illustration of the system for generating the signals supplied to a corner of the signal layer and guard plane layer for deriving touch position.

According to the present invention, the signal layer and a second conductive layer, which is denoted a guard plane layer, are integrated into the top substrate 24 of the display for use in sensing touch input. A non-conductive insulating layer is disposed between the signal layer and the guard plane layer. The guard plane layer is disposed between the signal layer and the common electrode. As described above with respect to FIG. 4, the corners of the signal layer are driven with a signal, and the current at each corner is measured. The position of the touch input (i.e., the point of contact) is derived from the currents measured at the corners of the signal layer. In addition, the guard plane layer is driven with a signal that reduces capacitive loading of the signal layer into the common electrode, and also reduces or eliminates capacitive coupling of noise current from the common electrode into the signal layer. The signal applied to the guard plane layer may be derived by scaling the amplitude of and/or phase shifting the signal applied to the signal layer. Alternatively, the signal applied to the signal layer may be derived by scaling and/or phase shifting the signal applied to the guard plane layer An example of the circuitry for generating signals for the signal layer and guard plane layer is illustrated in FIG. 12. For the sake of description, the signal layer, guard plane layer and common electrode are depicted as planar surfaces. The circuitry includes an oscillator that a reference signal. Effective signals for the signal layer and guard plane layer are generated by scaling and/or phase shifting the reference signal such that the effective signals, when applied to the signal layer and guard plane layer, respectively, have a matching amplitude and phase. In addition, it is preferable that zero current be required to drive the signal layer. In other words, it is preferable that current flows to signal layer only when a capacitive load, such as a finger or other body part, comes into close proximity to the signal layer. The effective signal for the signal layer is applied to the corners of the signal layer. In addition, each corner includes circuitry for measuring the current flow at the corner to derive the touch position. An example of such circuitry is described in U.S. Pat. No. 4,293,734 to Pepper, Jr., incorporated by reference above in its entirety. In addition, the effective signal for the guard plane layer is added to a signal based upon the drive signal supplied to the common electrode (preferably by inverting, scaling and/or phase shifting the drive signal) in order to reduce the capacitive coupling of noise current from the common electrode into the signal layer. For descriptive purposes, FIG. 12 depicts the circuitry applicable to one of the corners of the signal layer and guard plane layer. Similar circuitry (or portions of the circuitry shown in FIG. 12) is used to supply signals to the other corners of the signal layer and guard plane layer, respectively, to thereby derive the touch position from the current at the corners of the signal layer.

Instead of applying signals to the corners of the signal layer, the tip of an implement may carry a signal, and the current at the corners of the signal layer is measured. In this case, the position of the implement is derived from the currents at the corners of the signal layer. In contrast to the earlier case, the guard plane layer may be grounded to prevent noise from the common electrode 28 from coupling into the signal layer. Alternatively, it may be beneficial to invert and scale the amplitude of the signal(s) applied to the common electrode 28, and apply the resultant signal to the guard plane layer to actively cancel noise from the common electrode 28 that would otherwise couple into the signal layer. However, if the common electrode noise is not a problem, the guard plane layer may be left floating to minimize loading on the signal layer.

Figure 5:
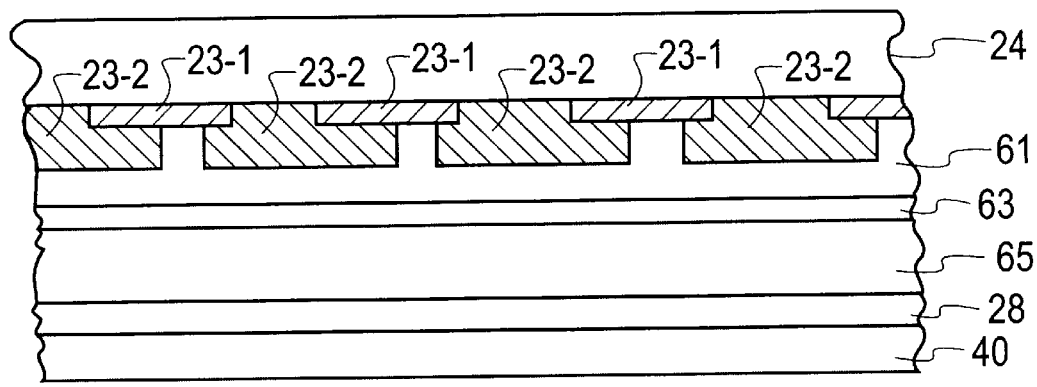
FIG. 5 is a partial cross section (A—A) of the liquid crystal display device of FIG. 1 illustrating an embodiment of the present invention wherein a patterned signal layer and guard plane layer are integrated into the top substrate 24.

FIG. 5 illustrates an embodiment of the present invention wherein a patterned conductive black matrix layer 23-1 is used as the signal layer. As is conventional, the patterned black matrix layer 23-1 is part of a color matrix layer 23 formed on the top substrate 24. The patterned conductive black matrix layer 23-1 may be formed from chromium and/or chromium oxide, or other suitable material that has low reflectivity and blocks the transmission of light. A transparent non-conducting insulating layer 61 is formed on the patterned black matrix material 23-1. The transparent non-conducting insulating layer 61 may be formed from a clear overcoat polymer such as acrylic, benzocyclobutene (BCB) or other suitable material. A continuous guard plane layer 63 is then formed on the insulating layer 61. The guard plane layer may be formed from a transparent conductive material such as ITO or other suitable material. The spacing between the black matrix layer 23-1 and the guard plane layer 63 is preferably 2–5 microns. A second transparent non-conducting insulating layer 65 is formed on the guard plane layer 63. The second transparent non-conducting insulating layer 65 may be formed from a clear overcoat polymer such as acrylic or BCB or other suitable material. The common electrode 28 is then formed on the second insulating later 65. The spacing between the guard plane layer 63 and the common electrode 28 is preferably 2–5 microns.

Figure 6:
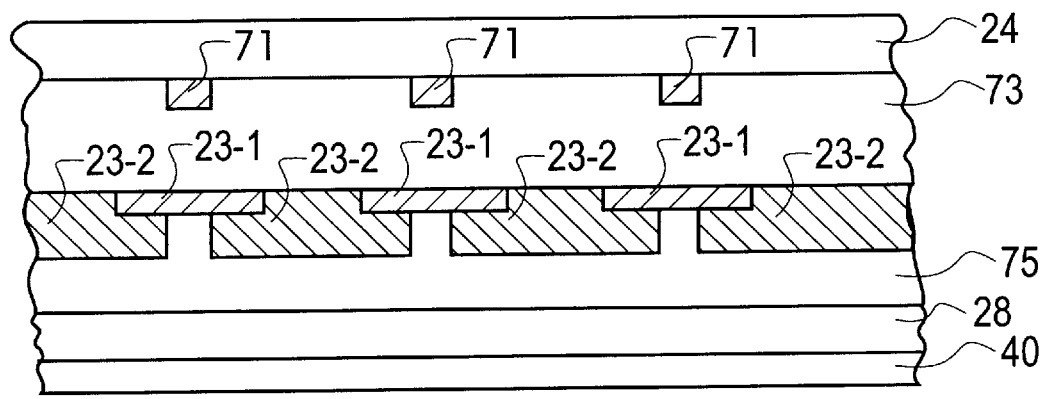
FIG. 6 is a partial cross section (A—A) of the liquid crystal display device of FIG. 1 illustrating an embodiment of the present invention wherein a patterned signal layer and guard plane layer are integrated into the top substrate 24.

FIG. 6 illustrates an embodiment of the present invention wherein a patterned conductive black matrix layer 23-1 is used as the guard plane layer. More specifically, a signal layer 71 is formed on the top substrate 24. The signal layer 71 may be formed from a transparent conductive material such as ITO, or a non-transparent conductive material such as chromium and/or chromium oxide (or other suitable material that has low reflectivity and blocks the transmission of light). A transparent non-conducting insulating layer 73 is formed on the signal layer 71. The transparent non-conducting insulating layer 73 may be formed from a clear overcoat polymer such as acrylic or BCB or other suitable material. The color matrix layer 23 is then formed on the insulating layer 73. As is conventional, the patterned black matrix layer 23-1 is part of the color matrix layer 23. The patterned conductive black matrix layer 23-1 may be formed from chromium and/or chromium oxide or other suitable material that has low resistivity and blocks the transmission of light. In addition, the patterned conductive black matrix layer 23-1 is used as the guard plane layer for touch input. Preferably, the patterning of the black matrix layer 23-1 is aligned with the patterning of the signal layer 71. For example, as shown in FIG. 6, the black matrix layer 23-1 may be patterned to cover the signal layer 71. The spacing between the signal layer 71 and the black matrix layer 23-1 is preferably 2–5 microns. A transparent non-conducting insulating layer 75 is then formed on the color matrix layer 23. The transparent non-conducting insulating layer 75 may be formed from a clear overcoat polymer such as acrylic or BCB or other suitable material. The common electrode 28 is then formed on the insulating layer 75. The spacing between the black matrix layer 23 and the common electrode 28 is preferably 2–5 microns.

Preferably, the resistance at the edges of the signal layer (the patterned black matrix layer 23-1 of FIG. 5 or the signal layer 71 of FIG. 6) integrated into the top substrate 24 is linearized in both the horizontal (X) direction and vertical (Y) direction. In this case, the position (X,Y) of the touch input (i.e., the point of contact) can be accurately derived from a ratio of the currents measured at the corners as follows:

$$X = \left(\frac{W}{2}\right)\frac{(I2+I3)(I1+I4)}{(I1+I2+I3+I4)}$$

$$Y = \left(\frac{H}{2}\right)\frac{(I1+I2)(I3+I4)}{(I1+I2+I3+I4)}$$

Figure 7:
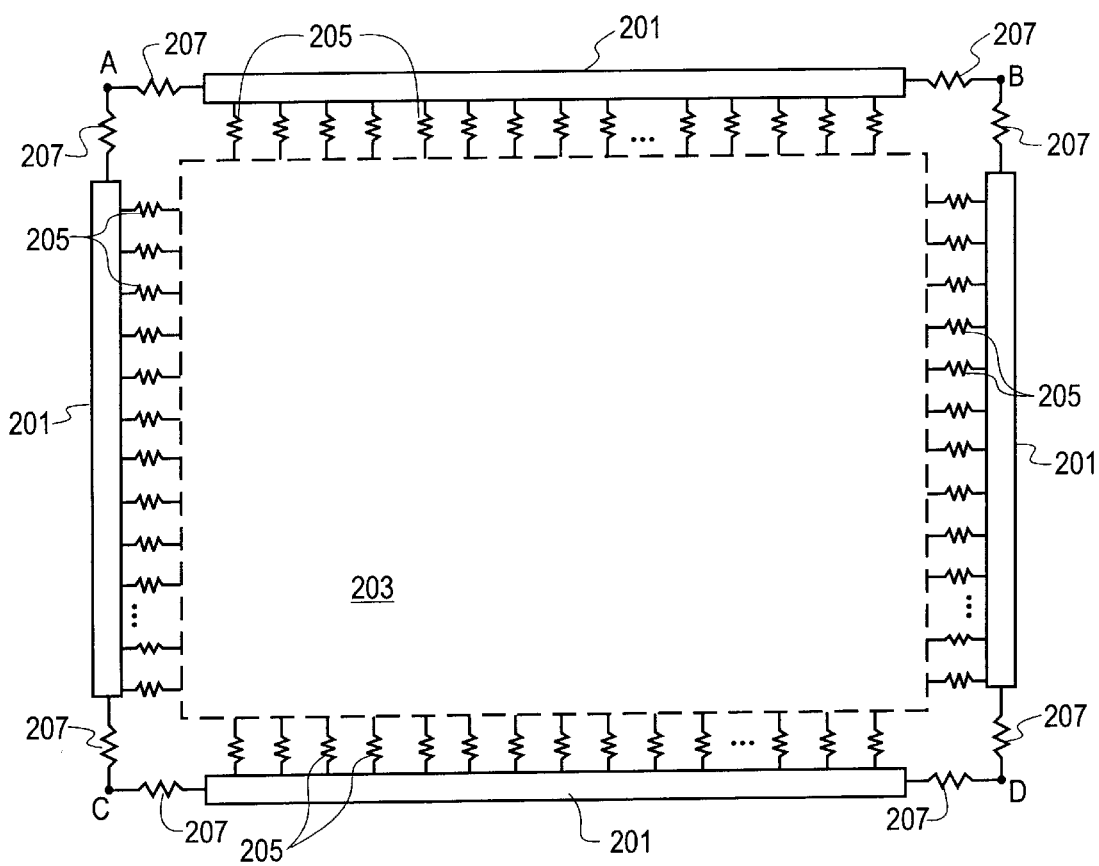
FIG. 7 is a pictorial illustration of a resistive network that is integrated into the top substrate 24 according to the present invention, to thereby linearize the resistance of the patterned conductive layer in the horizontal (X) and vertical (Y) directions.

These simple formule are most accurate if the resistance of the edges of the signal layer is "linearized". That is, if the upper 2 corners are driven by positive voltages and the bottom 2 corners are grounded, then the equipotentials should be straight horizontal lines, evenly spaced. Similarly, if the left 2 corners are driven and the right 2 corners grounded, then the equipotentials must be evenly spaced vertical lines. This requirement can be derived from elementary circuit theory. Linearization of the signal layer may be accomplished by coupling a network of resistors to the periphery of the patterned conductive layer whereby the resistance values (i.e., the geometry of the resistors) of the resistor network are varied such that the resistance of the patterned conductive layer is linear in both the X,Y directions. An example is shown in FIG. 7 where a resistive strip 201 is disposed alongside each of the four edges of the patterned conductive layer 203. A number of resistors 205 provide a connection between the resistive strips 201 and the patterned conductive layer as shown. In addition, resistors 207 provide a connection between the resistive strips 101 and four corner nodes A,B,C,D as shown. An exemplary method for determining the resistance values of the linearized resistor network is provided below.

FIGS. 8(A)–(H) illustrate an embodiment whereby the resistive network is integrated into the top substrate 24 shown in FIG. 6. More specifically, the resistor strips 201 and resistors 205 are fabricated by first depositing a patterned layer 81 on the top substrate 24. The patterned layer 81 may be a transparent conductive material such as ITO, or a non-transparent conductive material such as chromium and/or chromium oxide (or other suitable material that has low reflectivity and blocks the transmission of light). As shown in FIGS. 8(A) and (B), layer 81 is preferably patterned to form strip regions 83 (one shown) that define the resistor strips 201 and serpentine regions 85 (one shown) that defines the resistors 205 of the resistive network. The serpentine regions 85 conductively couple the strip regions 83 to the patterned signal layer 71. The patterned layer 81 may be deposited and patterned together with the patterned signal layer 71 of FIG. 6 as shown.

After depositing the patterned layer 81, a transparent non-conducting insulating layer 87 is preferably deposited and patterned as shown in FIGS. 8(C) and (D). The insulating layer 87 may be a transparent polymer such as an acrylic or BCB. If the insulating layer 87 is formed from a photosensitive material, the patterning is accomplished by exposure and development of the photosensitive material. Otherwise, conventional photolithography/etching techniques may be used to pattern the insulating layer 87. The insulating layer 87 is preferably patterned to partially cover the serpentine regions 85 of the conductive layer 81 as shown. In addition, the insulating layer 87 is preferably deposited and patterned as part of the insulating layer 73 of FIG. 6 as shown.

After depositing the insulating layer 87, a black matrix (BM) layer 89 is deposited and patterned as shown in FIGS. 8(E) and (F). Preferably, the black matrix layer 89 is a composite containing layers of chromium and chromium oxide wherein the chromium oxide is deposited first so that when viewed from the back, the BM layer 89 is as black as possible so as to reduce the amount of light reflected from the display to increase the display contrast ratio. The BM layer 89 provides sufficient adsorption so that substantially no light is transmitted through the BM layer 89. The black matrix layer 89 is preferably patterned such that it partially covers the serpentine regions 85 of the conductive layer 81, yet is electrical isolated from the serpentine regions 85 by the insulating layer 87 as shown. In addition, the black matrix layer 89 is preferably patterned such that it is formed directly on the strip regions 83 of the patterned layer 81 as shown. This composite layer (black matrix layer 89 and strip region 83) forms a low resistance layer, which may be beneficial in forming the resistor strips 201. In addition, the BM layer 89 is preferably deposited and patterned along with the BM material 23-1 of FIG. 6 as shown. In the array region of the panel, the patterning of the BM material 23-1 is designed to block light transmission except from the ITO pixel electrode region where the active matrix controls the applied voltage across the liquid crystal to select the correct gray level.

After depositing the BM layer 89, the color filter material 23-2 (including the red, green, and blue elements), insulating layer 75 and common electrode 28 of FIG. 6 are deposited and patterned as shown in FIGS. 8(G) and (H).

Figure 9A:
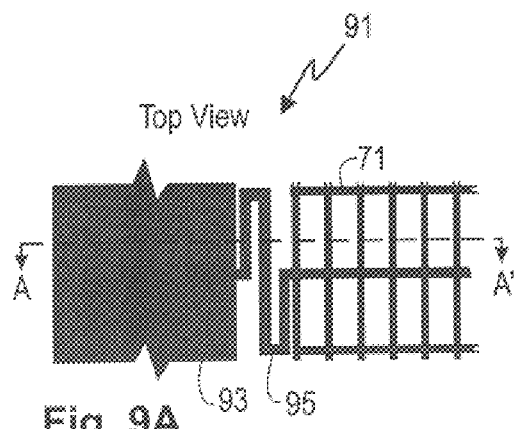
FIGS. 9(A)–(H) is a pictorial illustration of the process steps in forming the top substrate of FIG. 5.
Figure 9B:
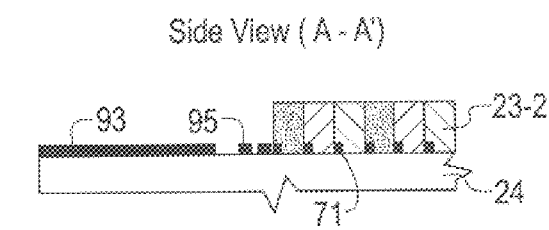

FIGS. 9(A)–(H) illustrate an embodiment whereby the resistive network is integrated into the top substrate 24 shown in FIG. 5. More specifically, the resistor strips 201 and resistors 205 are fabricated by first depositing a patterned layer 91 on the top substrate 24. The patterned layer 91 may be a non-transparent conductive material such as chromium and/or chromium oxide (or other suitable material that has low reflectivity and blocks the transmission of light). As shown in FIGS. 9(A) and (B), layer 91 is preferably patterned to form strip regions 93 (one shown) that define the resistor strips 201 and serpentine regions 95 (one shown) that defines the resistors 205 of the resistive network. The serpentine regions 95 conductively couple the strip regions 83 to the patterned signal layer (BM layer 23-1 of FIG. 5). The patterned layer 91 may be deposited and patterned together with the patterned BM material 23-1 of FIG. 5 as shown. In addition, the color filter material 23-2 (including the red, green, and blue elements) of FIG. 5 are typically deposited and patterned in conjunction with the BM material 23-1 as shown. Moreover, an additional layer of black matrix material (not shown) may be deposited and patterned such that it is formed directly on the strip regions 83, and thus form a low resistive layer, which may be beneficial in forming the resistor strips 201.

Figure 9C:
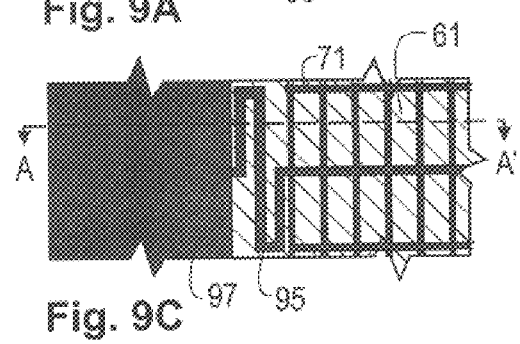
Figure 9D:
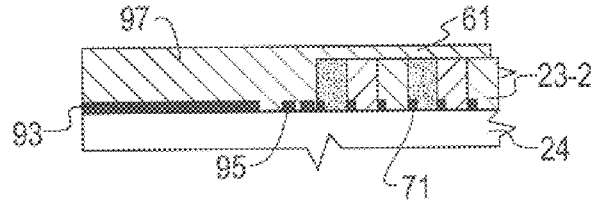

After depositing the patterned layer 91, a transparent non-conducting insulating layer 97 is preferably deposited and patterned as shown in FIGS. 9(C) and (D). The insulating layer 97 may be a transparent polymer such as an acrylic or BCB. If the insulating layer 97 is formed from a photosensitive material, the patterning is accomplished by exposure and development of the photosensitive material. Otherwise, conventional photolithography/etching techniques may be used to pattern the insulating layer 97. The insulating layer 97 is preferably deposited and patterned along with the insulating layer 61 of FIG. 5 as shown.

Figure 9E:
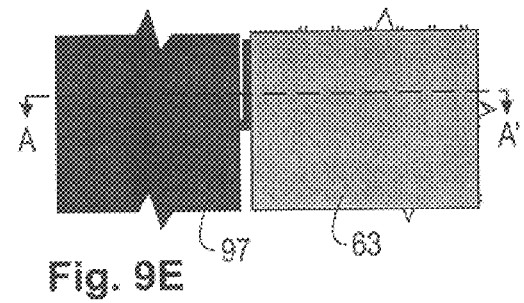
Figure 9F:
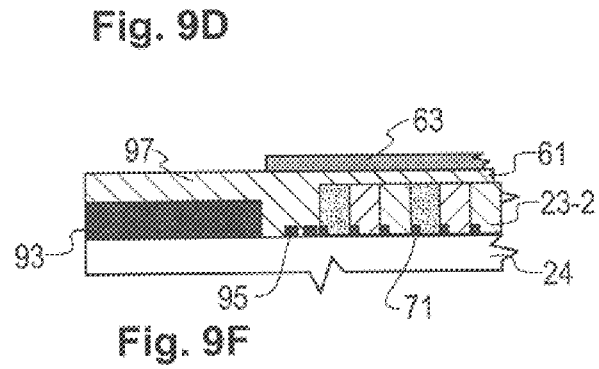

After depositing the insulating layer 97, the guard plane layer 63 is formed on the insulating layer 97 as shown in FIGS. 9(E) and (F). As discussed above with respect to FIG. 5, the guard plane layer 63 may be formed from a transparent conductive material such as ITO or other suitable material, and the guard plane layer 99 is disposed between the black-matrix material 23-1 and the common electrode 28.

Figure 9G:
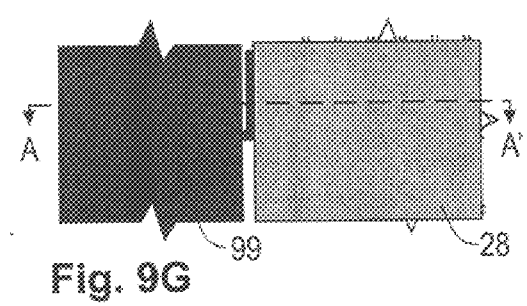
Figure 9H:
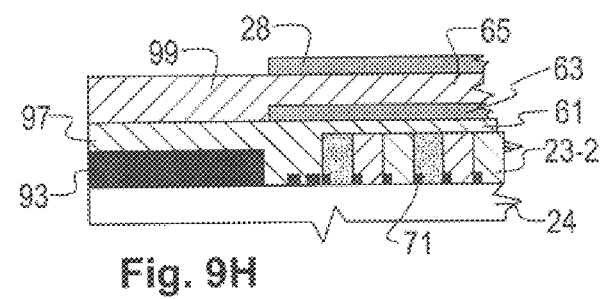

After depositing the guard plane layer 99, the transparent non-conducting insulating layer 65 and common electrode 28 of FIG. 5 are deposited and patterned as shown in FIGS. 9(G) and (H).

For both embodiments discussed above with respect to FIGS. 8(A)–(H) and 9(A)–(H), in each corner of the panel, a corner resistor 207 is formed between the resistor strips 201 and an electrical contact. The corner resistors 207 are preferably formed utilizing the same process as discussed above in forming the resistor strips 205. The electrical contacts are conductively coupled to the circuitry for measuring the current that flows from the corner to thereby derive the position of the touch input (i.e., the point of contact) as described above. In addition, an electrical contact to the guard plane layer is formed in each corner. The electrical contacts to the guard plane layer are conductively coupled to circuitry for driving the guard plane to thereby limit capacitive coupling between the common electrode and the patterned conductive layer as described above.

As described above, the resistive strips 201 and resistors 205 are integrally formed onto the top substrate in conjunction with process steps that form the signal layer and other elements of the liquid crystal display system. This approach is economically advantageous because additional process steps are not required to form the resistive strips 201 and resistors 205.

A method for linearizing the resistance of the signal layer is now set forth. We begin by calculating the resistors for a square screen with uniform sheet resistivity Rho_s (ohms/square) in both directions, and then transform the results to a rectangular screen with possibly different resistivity in the horizontal and vertical directions.

Figure 10:
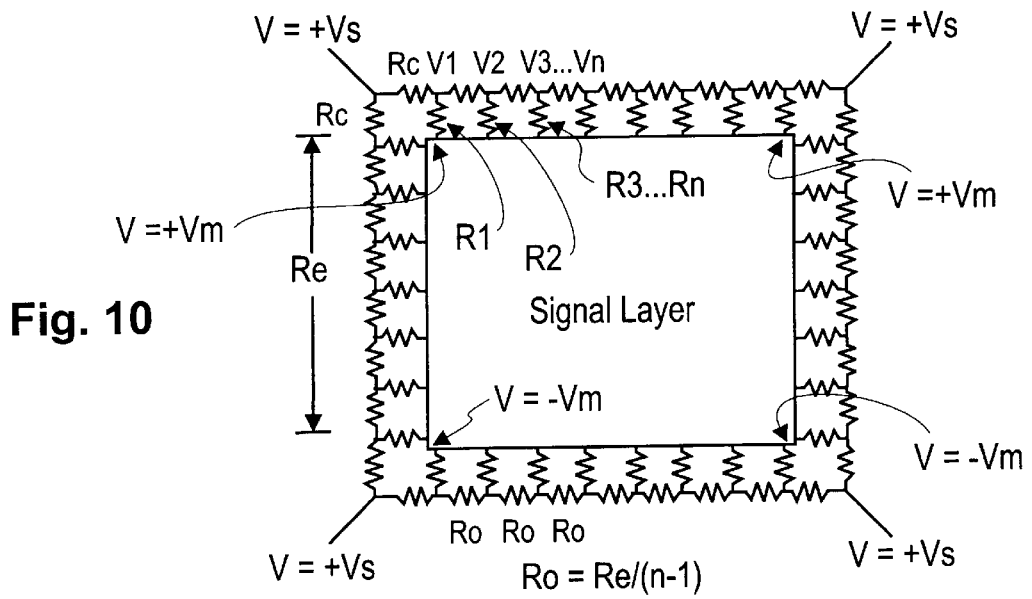
FIG. 10 is a pictorial illustration of a resistive network that linearizes the resistance of the a square signal layer in the horizontal (X) and vertical (Y) directions.

FIG. 10 shows the arrangement for the square screen in more detail. Because of the symmetry, each side will have the same resistor values. In actual operation for touch detection, all four corner electrodes are driven with the same AC signal, but for purposes of determining the edge resistor values, it is easier to consider the case where the upper and lower corners are driven with symmetric DC voltages (+1 volt on the upper corners and −1 volt DC on the lower corners, for example), and consider the currents and voltages on the resistive layer. The definitions for FIG. 10 are provided in the following table:

n . . . The number of feed resistors

Rho_s . . . The screen sheet resistivity (ohms/square)

Rs . . . The screen resistance from one edge to the other, in ohms, equal to Rho_s Re . . . The long edge resistors Rc . . . The corner resistors Ri . . . The feed resistors (i=1 . . . n)

Vs . . . The AC supply voltage, applied as shown

Vm . . . The AC voltage at the corners of the screen

Vi . . . The voltages along Re at the top (i=1 . . . n)

The resistors Ri are assumed to be equally spaced along the edges. They will be symmetric with respect to the center of the screen, so that Ri=Rn+1−i. Small values of n will produce a ripple in the equipotentials near the edges of the screen. Very large values will require large feed resistances, which will be difficult to fabricate. In general, one should choose n as large as possible, subject to manufacturability.

If the screen is correctly linearized, the equipotentials will be horizontal lines, equally spaced from top to bottom. In particular, the entire top edge should be at the corner potential +Vm, and the bottom edge at −Vm. The current density is proportional to the electric field, which is proportional to the gradient of the potential distribution. Therefore, if the equipotentials are equally spaced straight lines, the current density will be constant across the screen, flowing vertically from top to bottom. This means that there should be no current flow into or out of the screen from the sides. We immediately conclude that the potential variation along the side resistor strips Re must exactly match the potential variation in the screen. Otherwise, current would flow into or out of the screen through the side feed resistors. This condition will be met if, and only if, the side strips Re have constant resistance per unit length, and the voltage at each junction between Rc and Re is equal to the corner voltage Vm. From elementary circuit theory, the voltage Vm will be equal to Vs−IRc, where I is the current flowing in the side strip. The current is equal to 2Vs/(Rc+Re+Rc). We find:

$$Vm/Vs=1/(1+2Rc/Re) \quad (1)$$

Next consider the total current, Is, flowing through the screen. The screen has a voltage difference of 2Vm from top to bottom, and a resistance Rs. Therefore:

$$I = 2Vm/Rs \tag{2}$$

This current must flow through the top resistors, Rc and Re, and then into the screen through the feed resistors. From symmetry, half this current must flow in from each corner. There will then be a voltage drop in the top resistor Rc equal to 0.5 RcIs, so that the first voltage (V1 in FIG. A.3) will be given by:

$$V1 = Vs - 0.5RcIs = Vs - RcVm/Rs \tag{3}$$

We next compute the variation of Vi along the top edge. Because the current to the screen flows along Re from both corners, the voltage will decrease symmetrically towards the center. Therefore, we only need to compute n/2 values. For convenience, assume n is an even integer. Let the resistance along the strip between each feed resistor be Ro:

$$Ro = Re/(n-1) \tag{4}$$

As noted above, the current density must be uniform. Therefore, each of the equally-spaced feed resistors must carry the same current, say If, given by:

$$If = Is/n \tag{5a}$$

Using equation 2, we find:

$$If = 2Vm/nRs \tag{5b}$$

The current flowing in the strip Re thus decreases by If after each feed resistor, starting with the maximum value 0.5Is. With this in mind, we write down the first few voltages:

$$V1 = Vs - RcVm/Rs \text{ (Equation 3)} \tag{6a}$$

$$V2 = V1 - (0.5Is - 1 \, If)Ro = V1 - 0.5RoIs + (1)RoIf \tag{6b}$$

$$V3 = V2 - (0.5Is - 2 \, If)Ro = V1 - 1.0RoIs + (1+2)RoIf \tag{6c}$$

$$V4 = V3 - (0.5Is - 3If)Ro = V1 - 1.5RoIs + (1+2+3)RoIf \tag{6d}$$

$$V5 = V4 - (0.5Is - 3If)Ro = V1 - 2.0RoIs + (1+2+3+4)RoIf \tag{6d}$$

The second term can be written as −0.5(i−1) multiplied by RoIf. The Third term is the sum of the first (i−1) integers, also multiplied by RoIf. Therefore, we can write the i'th voltage as:

$$Vi = V1 - 0.5(i-1)RoIs + 0.5(i)(i-1)RoIf \tag{7}$$

Using equations 4 and 5a, we find:

$$Vi = V1 - 0.5(i-1)ReIs/(n-1) + 0.5(i)(i-1)ReIs/n(n-1) \tag{8a}$$

$$Vi = V1 - 0.5ReIs(i-1)(n-i)/n(n-1) \tag{8b}$$

Substituting from equations 2, 3, and 6a, we have:

$$Vi = Vs - RcVm/Rs - Vm(Re/Rs)(i-1)(n-i)/n(n-1) \tag{8c}$$

Finally, we can use equation 1 to eliminate Vs:

$$Vi = Vm(1+2Rc/Re) - Vm(Rc/Rs) - Vm(Re/Rs)(i-1)(n-i)/n(n-1) \tag{9a}$$

$$Vi = Vm(1+2Rc/Re - Rc/Rs - (Re/Rs)(i-1)(n-i)/n(n-1)) \tag{9b}$$

Equation 9b expresses Vi in terms of the parameters Re, Rc, Rs, and Vm. We can now calculate the feed resistors Ri. Each feed resistor Ri has the voltage Vi at one end, and the screen voltage Vm at the other, hence the resistor current will be (Vi−Vm)/Ri. As noted above, this current is the same for each resistor, and equal to If=Is/n, thus:

$$(Vi - Vm)/Ri = Is/n = (2Vm/Rs)/n \tag{10a}$$

$$Ri = (Vi - Vm)nRs/2Vm \tag{10b}$$

$$Ri = 0.5nRs(2Rc/Re - Rc/Rs - (Re/Rs)(i-1)(n-i)/n(n-1)) \tag{10c}$$

Thus, given a set of resistor values (Rs, Re, Rc), we can use equation 10c to calculate the feed resistor values which will linearize the screen.

We now need a procedure to select suitable values for Re, Rc, Rs. In general, the screen resistance Rs is fixed by the choice of conducting material. It is then necessary to choose suitable values of Re and Rc. These values should be chosen to maximize the coupling ratio Vm/Vs of equation 1, as this will ensure an efficient transfer of signal to the external circuitry. However, careful analysis of the equations shows that not all combinations of (Rs, Re and Rc) can be used. If incorrect values are chosen, some of the voltages (Vi−Vm) will come out negative. From equation 9b, the worst-case (smallest) voltage occurs at the middle of the screen. Calling this Vmin and substituting i=n/2 into equation 9b, we have:

$$Vmin = Vm(1+2Rc/Re - Rc/Rs - (Re/4Rm)(n-2)/(n-1)) \tag{11}$$

The requirement that (Vmin−Vm) be greater than 0 becomes:

$$Vm(1+2Rc/Re) - Vm(Rc/Rs) - Vm(Re/4Rm)(n-2)/(n-1) > Vm \tag{12a}$$

After some algebra, this becomes:

$$2Rc/Re > (Rc/Rs) + (Re/4Rm)(n-2)/(n-1) \tag{12b}$$

It is convenient to introduce two dimension-less ratios, K and A:

$$K = Re/2Rs \tag{13a}$$

$$A = Vs/Vm \tag{13b}$$

Using equation 1:

$$A = 1 + 2Rc/Re \tag{13c}$$

Using equations 12b, 8c and 10b, we find:

$$K < Kmax \tag{14a}$$

$$Kmax = (A-1)/(A-1+0.5(n-2)/(n-1)) \tag{14b}$$

$$Vi/Vm = A - K(A-1) - 2K(i-1)(n-i)/n(n-1) \tag{14c}$$

$$Ri = 0.5nRs(Vi/Vm - 1) \tag{14d}$$

$$Re = 2KRs \tag{14e}$$

$$Rc = 0.5Re(A-1) \tag{14f}$$

These equations can be applied as follows. First, choose the value for Rs according to the screen material. Then choose a trial value for the ratio Vm/Vs. Values close to 1 increase the coupling. Calculate A, which is the inverse of the ratio, then calculate Kmax from equation 14a. Pick a value for K which is perhaps 20% smaller than Kmax (if K is chosen too close to Kmax, there will be a very large spread in the resistor values, and the properties of the screen will be very sensitive to manufacturing tolerances). Next, calculate the required values for Re and Rc, using equations 14e and 14f.

It may happen that the required value for Re is too low to manufacture in the limited space around the edge of the screen, using convenient materials. This is because Re is very long and narrow. In this case, a lower value for (Vm/Vs) should be tried. If suitable values are found, then equation 10c can be used to calculate the feed resistors.

Figure 11:
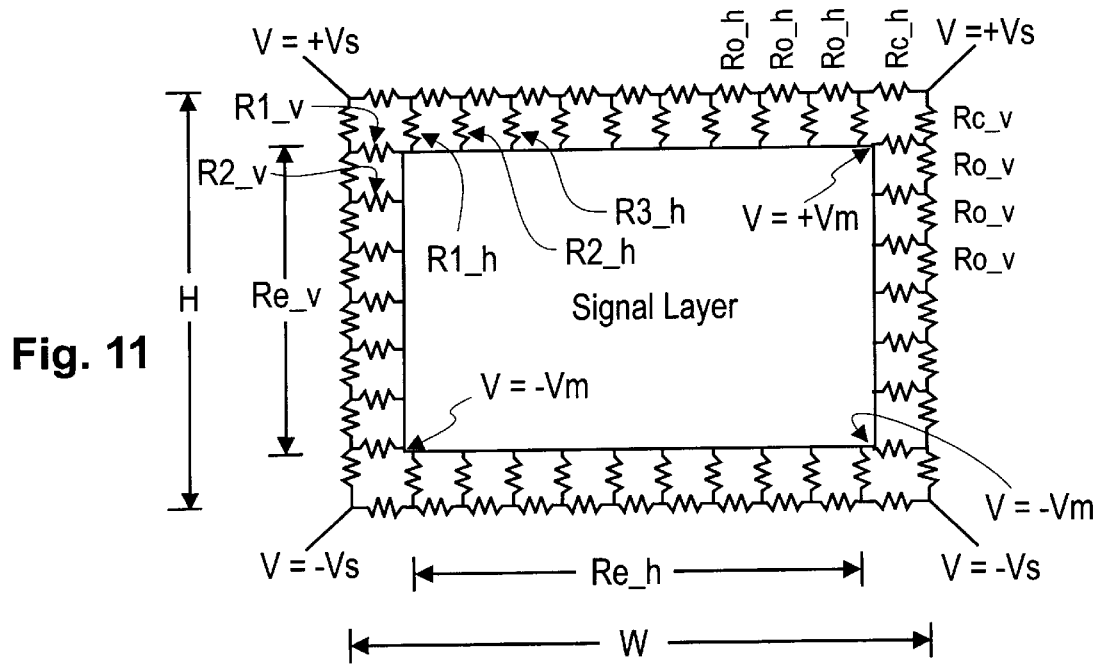
FIG. 11 is a pictorial illustration of a resistive network that linearizes the resistance of a rectangular signal layer in the horizontal (X) and vertical (Y) directions.

Once the problem is solved for a square screen, it is easy to transform it to a rectangular screen of width W and height H as shown in FIG. 11. Let the screen resistivity in the horizontal and vertical directions be Rh and Vh (ohms/square). Let the screen resistance measured vertically be Rs_v, and the screen resistance measured horizontally be Rs_h. We have:

$$Rs\_v=Rv(H/W) \text{ ohms} \quad (15a)$$

$$Rs\_h=Rh(W/H) \text{ ohms} \quad (15b)$$

We then transform the previously calculated resistor values across the top as follows:

$$Re\_h=Re(Rs\_v/Rs) \text{ ohms} \quad (16a)$$

$$Rc\_h=Rc(Rs\_v/Rs) \text{ ohms} \quad (16b)$$

$$Ri\_h=Ri(Rs\_v/Rs) \text{ ohms} \quad (16c)$$

We then transform the previously calculated resistor values down the side as follows:

$$Re\_v=Re(Rs\_h/Rs) \text{ ohms} \quad (16d)$$

$$Rc\_v=Rc(Rs\_h/Rs) \text{ ohms} \quad (16e)$$

$$Ri\_v=Ri(Rs\_h/Rs) \text{ ohms} \quad (16f)$$

We omit a formal proof. Briefly, this works because the current flow to the screen in the vertical direction goes through the top resistors, while the flow in the horizontal direction goes through the side resistors. By changing each set of resistors as above, we preserve the voltages computed for the square screen.

Advantageously, the LCD of the present invention includes a signal layer and guard plane layer integrated onto the top substrate of the LCD, wherein the guard plane layer is disposed between the signal layer and common electrode of the top substrate. The signal layer is driven with a source signal, and the response measured. The guard plane layer is driven with a signal that lowers the capacitive coupling between the common electrode and the signal layer, which enables the determination of contact position of a portion of the human body (such as a finger or a toe) based upon the measured response to the source signal applied to the signal layer. Moreover, integration of the signal layer and guard plane layer onto the top substrate of the LCD provides for a low cost substitute to add-on touch input screens.

Alternatively, the tip of an implement may be driven with a source signal, and the response to the source signal on the signal layer measured. The contact position of the implement tip on the top substrate is determined based upon the measured response to the source signal.

The signal layer and guard plane layer of the present invention is described above as embodied in an active matrix LCD system. However, the present invention is not limited in this respect and can be embodied in any display system wherein a matrix of display elements are viewed from above a first side of a substrate and the display elements are disposed on the second side (i.e., the opposite side) of the substrate. For example, the present invention may be embodied in passive matrix LCD systems. In such systems, the TFT devices and data lines are omitted from the bottom substrate, and the common electrode formed on the top substrate is patterned to form data lines (which are functionally equivalent to the data lines 31 of the active matrix display). The matrix of sub-pixel areas is formed by the intersection between the gate lines of the bottom substrate and the patterned data lines of the top substrate. In such a system, the signal layer and guard plane layer may be integrated into the top substrate of the passive matrix display and disposed between the patterned data lines and the top substrate of the passive matrix display.

Similarly, the present invention may be embodied in a magnetic matrix display system (an example of which is described in U.S. patent—application Ser. No. 08/695,857—filed Aug. 9, 1996 in the name of Knox et. al., commonly assigned to the assignee of the present invention herein incorporated by reference in its entirety). Such a system includes a top glass substrate having a plurality of phosphor elements (e.g., phosphor strips) facing an electron source. A magnetic matrix controllably directs the electrons produced by the electron source to scan the phosphor elements of the top substrate. In such a system, the signal layer and guard plane layer of the present invention may be integrated into the top substrate of the magnetic matrix display and disposed between the phosphor elements and the top substrate of the magnetic matrix display.

While the invention has been described in connection with specific embodiments, it will be understood that those with skill in the art may be able to develop variations of the disclosed embodiments without departing from the spirit of the invention or the scope of the following claims.

We claim:

1. A liquid crystal display device comprising;
   a substrate;
   a signal layer integrally disposed on said substrate, wherein touch position is derived by circuitry according to response to signals applied to said signal layer, wherein said signal layer is formed from a substantially transparent conductive material;
   a patterned layer integrally diagnosed on said substrate wherein said patterned layer comprises a light absorbing material that has low reflectivity and blocks transmission of light; and
   at least one resistor integrally disposed on said substrate, coupled between said signal layer and said circuitry, wherein said at least one resistor comprises a first layer formed from said substantially transparent conductive material of said signal layer and a second layer formed from said light absorbing material of said patterned layer.

2. The liquid crystal display of claim 1, wherein said light absorbing material comprises one of chromium and chromium oxide.

3. The liquid crystal display device of claim 2, wherein said substantially transparent conductive material comprises indium tin oxide.

4. The liquid crystal display device of claim 1, wherein said at least one resistor is part of a resistor network for linearizing resistance of said signal layer in a vertical direction and horizontal direction.

5. The liquid crystal display device of claim 4, wherein said resistor network comprises a plurality of resistive strips and a plurality of serpentine resistors coupled between said resistive strips and said signal layer.

6. A method for manufacturing a liquid crystal display device comprising the steps of;

forming a signal layer integrally disposed on a substrate, wherein touch position is derived by circuitry according to response to signals applied to said signal layer, wherein said signal layer is formed from a substantially transparent conductive material;

forming a patterned layer integrally disposed on said substrate, wherein said patterned layer comprises a light absorbing material that has low reflectivity and blocks transmission of light; and forming at least one resistor integrally disposed on said substrate, wherein said at least one resistor comprises a first layer formed from said substantially transparent conductive material of said signal layer and a second layer formed from said light absorbing material of said patterned layer.

7. The method of claim 6, wherein said light absorbing material comprises one of chromium and chromium oxide.

8. The method of claim 7, wherein said substantially transparent conductive material comprises indium tin oxide.

9. The method of claim 6, wherein said at least one resistor is part of a resistor network for linearizing resistance of said signal layer in a vertical direction and horizontal direction.

10. The method of claim 9, wherein said resistor network comprises a plurality of resistive strips and a plurality of serpentine resistors coupled between said resistive strips and said signal layer.

* * * * *